UNITED STATES PATENT OFFICE.

JOHN C. WHITE, OF QUINCY, ILLINOIS.

IMPROVEMENT IN PRINTING-INKS.

Specification forming part of Letters Patent No. 126,601, dated May 7, 1872.

*To all whom it may concern:*

Be it known that I, JOHN C. WHITE, of the city of Quincy, in the county of Adams and State of Illinois, have invented a new and useful Improvement in Printing-Ink, of which the following is a description:

Nature and Objects of the Invention.

The invention relates to the production of printing-ink from the oil of gas, mineral, or vegetable tar, pitch, or resin, prepared in the manner herein indicated and compounded with burnt corn-meal or flour and linseed-oil.

General Description.

A kettle or other reservoir is partially filled with gas, mineral or vegetable tar, and alcohol, and is properly placed and heated in any convenient manner; the alcohol is then ignited. The kettle is closed in an air-tight manner, save an aperture in its upper part, in which is provided a tube or pipe, which may be siphon-shaped or angular. In the latter case it should have joints and elbows, so that it may be readily taken apart and cleaned. The object of using the angular form is to break the passage of the flame of the alcohol when burning in the kettle. The mouth or end of this tube should be lower than the bottom of the kettle and properly situated above a receiving-vessel, and is provided upon its exterior, at or about its center, with a wet cloth, for the purpose of checking the flame of the burning alcohol. The combustion in the kettle sets free the oleaginous matter in the tar, which rises in the form of vapor into the pipe, is therein condensed, and descends into the receiving-vessel. Care must be observed that the oil in the receiving-vessel does not so rise as to close the mouth of the pipe. The oil is then placed in another vessel and mixed with burnt corn-meal or flour in about the proportions of ten gallons (10 gallons) of oil to one gallon (1 gallon) of meal, or so as to give the mixture about the consistency of molasses. To this compound is added the proper amount of linseed-oil to act as a drier. The proportion of oil is about one ounce (1 ounce) to every gallon of the mixture. After this the compound is boiled in order to thoroughly intermingle the several ingredients when it is ready for use.

If a better quality of ink is desired, the oil of pitch may be extracted and used as that of tar aforesaid; a still better quality can be obtained by using the oil extracted from resin.

Claims.

What I claim as my invention, and desire to secure by Letters Patent, is—

1. The oil of gas-tar, or other tar, pitch, or resin, used in the manner specified.
2. The compound herein described, for the purposes set forth.

In testimony that I claim the foregoing invention of improvements in printing-ink as above described, I have hereunto set my hand and seal this 18th day of March, 1872.

JOHN C. WHITE. [L. S.]

Witnesses:
J. H. HUHNS,
J. K. BURBANK.